(12) United States Patent
Hwang et al.

(10) Patent No.: US 12,217,415 B2
(45) Date of Patent: Feb. 4, 2025

(54) METHOD OF MANUFACTURING A DISPLAY DEVICE

(71) Applicant: Samsung Display Co., Ltd., Yongin-si (KR)

(72) Inventors: Tae-Jin Hwang, Gwacheon-si (KR); Hyeongmin Ahn, Yongin-si (KR)

(73) Assignee: SAMSUNG DISPLAY CO., LTD., Gyeonggi-Do (KR)

( * ) Notice: Subject to any disclaimer, the term of this patent is extended or adjusted under 35 U.S.C. 154(b) by 384 days.

(21) Appl. No.: 17/859,358

(22) Filed: Jul. 7, 2022

(65) Prior Publication Data

US 2023/0101745 A1    Mar. 30, 2023

(30) Foreign Application Priority Data

Sep. 29, 2021  (KR) ........................ 10-2021-0129255

(51) Int. Cl.
| | |
|---|---|
| *G06T 7/00* | (2017.01) |
| *G06T 5/50* | (2006.01) |
| *G06T 5/70* | (2024.01) |
| *G06T 5/80* | (2024.01) |
| *G06F 3/041* | (2006.01) |

(52) U.S. Cl.
CPC ............... *G06T 7/001* (2013.01); *G06T 5/50* (2013.01); *G06T 5/70* (2024.01); *G06T 5/80* (2024.01); *G06F 3/041* (2013.01); *G06F 2203/04103* (2013.01)

(58) Field of Classification Search
CPC .. G06T 7/001; G06T 5/50; G06T 5/70; G06T 5/80; G06T 2207/30121; G06F 3/041; G06F 2203/04103; G01N 21/95607; G02F 1/1309; G02F 1/133331; G02F 1/133354

See application file for complete search history.

(56) References Cited

U.S. PATENT DOCUMENTS

2010/0310130 A1* 12/2010 Beghuin .......... G01N 21/95623
                                                            382/106

FOREIGN PATENT DOCUMENTS

| | | |
|---|---|---|
| KR | 101733197 B1 | 5/2017 |
| KR | 102030480 B1 | 10/2019 |

* cited by examiner

*Primary Examiner* — Hwa Andrew Lee
(74) *Attorney, Agent, or Firm* — CANTOR COLBURN LLP

(57) ABSTRACT

A method of manufacturing a display device includes preparing a cover substrate assembly including a cover substrate, a protective film attached to a lower surface of the cover substrate, and an inspection pattern disposed between the cover substrate and the protective film, obtaining a first image by imaging the inspection pattern through an upper surface of the cover substrate, obtaining noise data by comparing a reference image of the inspection pattern with the first image, obtaining a second image by imaging the cover substrate assembly, obtaining a corrected image of the second image by reflecting the noise data in the second image, and detecting a defect of the cover substrate based on the corrected image of the second image.

20 Claims, 22 Drawing Sheets

METHOD OF MANUFACTURING A DISPLAY DEVICE

This application claims priority to Korean Patent Application No. 10-2021-0129255 filed on Sep. 29, 2021, and all the benefits accruing therefrom under 35 U.S.C. § 119, the content of which in its entirety is herein incorporated by reference.

BACKGROUND

1. Field

Embodiments relate to a method of manufacturing a display device for displaying an image.

2. Description of the Related Art

A display device may be manufactured by combining a display panel for displaying an image and a cover substrate for protecting the display panel. A protective film may be attached to the cover substrate until the cover panel is combined with the display panel to protect the cover substrate from impurities, etc. Before the display panel and the cover substrate are combined with each other, defects of the cover substrate may be inspected.

SUMMARY

When defects of the cover substrate are inspected, if the protective film attached to the cover substrate is removed in advance, the cover substrate may be damaged. If the defects of the cover substrate are inspected without removing the protective film attached to the cover substrate, accuracy of inspection may be deteriorated.

Embodiments provide a method of manufacturing a display panel.

An embodiment of a method of manufacturing a display device includes preparing a cover substrate assembly including a cover substrate, a protective film attached to a lower surface of the cover substrate, and an inspection pattern disposed between the cover substrate and the protective film, obtaining a first image by imaging the inspection pattern through an upper surface of the cover substrate, obtaining noise data by comparing a reference image of the inspection pattern with the first image, obtaining a second image by imaging the cover substrate assembly, obtaining a corrected image of the second image by reflecting the noise data in the second image, and detecting a defect of the cover substrate based on the corrected image of the second image.

In an embodiment, the noise data may include a value corresponding to a noise area difference which is a difference between a reference area of the inspection pattern in the reference image and an inspection area of the inspection pattern in the first image.

In an embodiment, the obtaining the corrected image of the second image may include obtaining an imaging defect area of the defect in the second image, and obtaining the corrected image of the second image by reflecting the noise area difference in the imaging defect area.

In an embodiment, the obtaining the corrected image of the second image by reflecting the noise area difference in the imaging defect area may include comparing the imaging defect area and the inspection area, and correcting the imaging defect area by reflecting the noise area difference when the imaging defect area is the same as the inspection area.

In an embodiment, the obtaining the corrected image of the second image by reflecting the noise area difference in the imaging defect area may further include obtaining an area correction value proportional to an area difference between the imaging defect area and the inspection area when the imaging defect area is different from the inspection area, obtaining a corrected area difference by reflecting the area correction value to the noise area difference, and correcting the imaging defect area by reflecting the corrected area difference.

In an embodiment, the detecting the defect of the cover substrate based on the corrected image of the second image may include obtaining a defect area of the defect, comparing the defect area with a reference defect area, and classifying the cover substrate as a defective cover substrate when the defect area is larger than the reference defect area.

In an embodiment, the inspection pattern may include first to $n^{th}$ size inspection patterns, each having different areas from each other, where n is a natural number equal to or greater than 2.

In an embodiment, the noise data may include a value corresponding to a noise grayscale difference which is a difference between a reference grayscale of the inspection pattern in the reference image and an imaging grayscale of the inspection pattern in the first image.

In an embodiment, the obtaining the corrected image of the second image by reflecting the noise data in the second image may include obtaining an imaging grayscale distribution of the cover substrate assembly from the second image, and obtaining the corrected image of the second image having a corrected grayscale distribution by reflecting the noise grayscale difference in the imaging grayscale distribution.

In an embodiment, the detecting the defect of the cover substrate based on the corrected image of the second image may include comparing the corrected grayscale distribution with a normal grayscale range, and classifying the cover substrate as a defective cover substrate when a grayscale defect having a grayscale outside the normal grayscale range is detected in the corrected grayscale distribution.

In an embodiment, the inspection pattern may include first to $m^{th}$ grayscale inspection patterns, each having different grayscales from each other, where m may be a natural number equal to or greater than 2.

In an embodiment, the method may further include removing the protective film and the inspection pattern from the cover substrate assembly when the defect is not detected after the detecting the defect of the cover substrate based on the corrected image of the second image, and bonding a display panel including pixels under the cover substrate.

In an embodiment, the cover substrate may include a cover window, and a touch sensing layer disposed under the cover window.

A method of manufacturing a display device may include forming a cover substrate assembly by bonding a protective film to a lower surface of a cover substrate, forming an inspection film by removing a portion of the protective film, placing the inspection film over an inspection pattern provided on an upper surface of display panel, obtaining a first image by imaging the inspection pattern through a lower surface of the display panel, obtaining noise data by comparing a reference image of the inspection pattern with the first image, obtaining a second image by imaging the cover substrate assembly, obtaining a corrected image of the second image by reflecting the noise data in the second image, and detecting a defect of the cover substrate based on the corrected image of the second image.

In an embodiment, the display panel may include a display area and a peripheral area surrounding the display area, and the inspection pattern may be disposed on the peripheral area.

In an embodiment, the cover substrate may include a first area corresponding to the display area and a second area corresponding to the peripheral area, and the inspection film may be formed by removing a portion of the protective film overlapping the second region.

In an embodiment, the noise data may include a value corresponding to a noise area difference which is a difference between a reference area of the inspection pattern in the reference image and an inspection area of the inspection pattern in the first image.

In an embodiment, the noise data may include a value corresponding to a noise grayscale difference which is a difference between a reference grayscale of the inspection pattern in the reference image and an imaging grayscale of the inspection pattern in the first image.

In an embodiment, the method may further include removing the protective film from the cover substrate assembly when the defect is not detected after the detecting the defect of the cover substrate based on the corrected image of the second image, and bonding a display panel under the cover substrate.

In an embodiment, the cover substrate may include a cover window, and a touch sensing layer disposed under the cover window.

According to embodiments of the invention, the defect of the cover substrate may be efficiently detected in a state in which the protective film is not remover or in a state in which only a portion of the protective film is removed.

DETAILED DESCRIPTION

Figure 1:
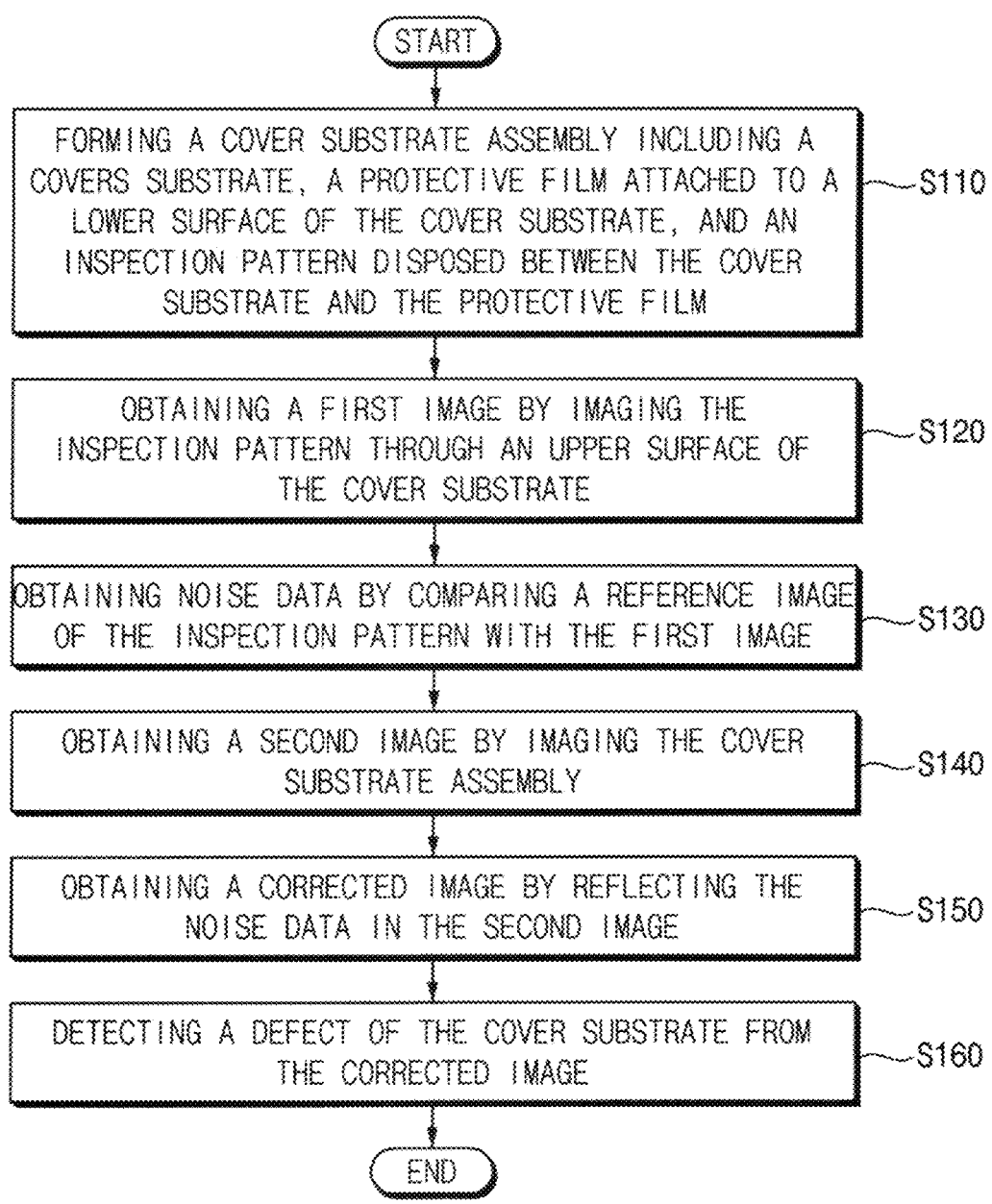
FIG. 1 is a flowchart illustrating a method of manufacturing a display device according to an embodiment.

The invention now will be described more fully hereinafter with reference to the accompanying drawings, in which various embodiments are shown. This invention may, however, be embodied in many different forms, and should not be construed as limited to the embodiments set forth herein. Rather, these embodiments are provided so that this disclosure will be thorough and complete, and will fully convey the scope of the invention to those skilled in the art. Like reference numerals refer to like elements throughout.

It will be understood that when an element is referred to as being "on" another element, it can be directly on the other element or intervening elements may be therebetween. In contrast, when an element is referred to as being "directly on" another element, there are no intervening elements present.

It will be understood that, although the terms "first," "second," "third" etc. may be used herein to describe various elements, components, regions, layers and/or sections, these elements, components, regions, layers and/or sections should not be limited by these terms. These terms are only used to distinguish one element, component, region, layer or section from another element, component, region, layer or section. Thus, "a first element," "component," "region," "layer" or "section" discussed below could be termed a second element, component, region, layer or section without departing from the teachings herein.

The terminology used herein is for the purpose of describing particular embodiments only and is not intended to be limiting. As used herein, "a", "an," "the," and "at least one" do not denote a limitation of quantity, and are intended to include both the singular and plural, unless the context clearly indicates otherwise. For example, "an element" has the same meaning as "at least one element," unless the context clearly indicates otherwise. "At least one" is not to be construed as limiting "a" or "an." "Or" means "and/or." As used herein, the term "and/or" includes any and all combinations of one or more of the associated listed items. It will be further understood that the terms "comprises" and/or "comprising," or "includes" and/or "including" when used in this specification, specify the presence of stated features, regions, integers, steps, operations, elements, and/or components, but do not preclude the presence or addition of one or more other features, regions, integers, steps, operations, elements, components, and/or groups thereof.

Furthermore, relative terms, such as "lower" or "bottom" and "upper" or "top," may be used herein to describe one element's relationship to another element as illustrated in the Figures. It will be understood that relative terms are intended to encompass different orientations of the device in addition to the orientation depicted in the Figures. For example, if the device in one of the figures is turned over, elements described as being on the "lower" side of other elements would then be oriented on "upper" sides of the other elements. The term "lower," can therefore, encompasses both an orientation of "lower" and "upper," depending on the particular orientation of the figure. Similarly, if the device in one of the figures is turned over, elements described as "below" or "beneath" other elements would then be oriented "above" the other elements. The terms "below" or "beneath" can, therefore, encompass both an orientation of above and below.

Unless otherwise defined, all terms (including technical and scientific terms) used herein have the same meaning as commonly understood by one of ordinary skill in the art to which this disclosure belongs. It will be further understood that terms, such as those defined in commonly used dictionaries, should be interpreted as having a meaning that is consistent with their meaning in the context of the relevant art and the disclosure, and will not be interpreted in an idealized or overly formal sense unless expressly so defined herein.

Embodiments described herein should not be construed as limited to the particular shapes of regions as illustrated herein but are to include deviations in shapes that result, for example, from manufacturing. For example, a region illustrated or described as flat may, typically, have rough and/or nonlinear features. Moreover, sharp angles that are illustrated may be rounded. Thus, the regions illustrated in the figures are schematic in nature and their shapes are not intended to illustrate the precise shape of a region and are not intended to limit the scope of the claims.

Hereinafter, embodiments of the invention will be described in detail with reference to the accompanying drawings.

FIG. 1 is a flowchart illustrating a method of manufacturing a display device according to an embodiment.

Referring to FIG. 1, an embodiment of a method of manufacturing a display device according to the invention may include preparing a cover substrate assembly including a cover substrate, a protective film attached to a lower surface of the cover substrate, and an inspection pattern disposed between the cover substrate and the protective film (S110), obtaining a first image by imaging the inspection pattern through an upper surface of the cover substrate (S120), obtaining noise data by comparing a reference image of the inspection pattern with the first image (S130), obtaining a second image by imaging the cover substrate assembly (S140), obtaining a corrected image by reflecting the noise data in the second image (S150), and detecting a defect of the cover substrate from (or based on) the corrected image (S160).

Figure 2:
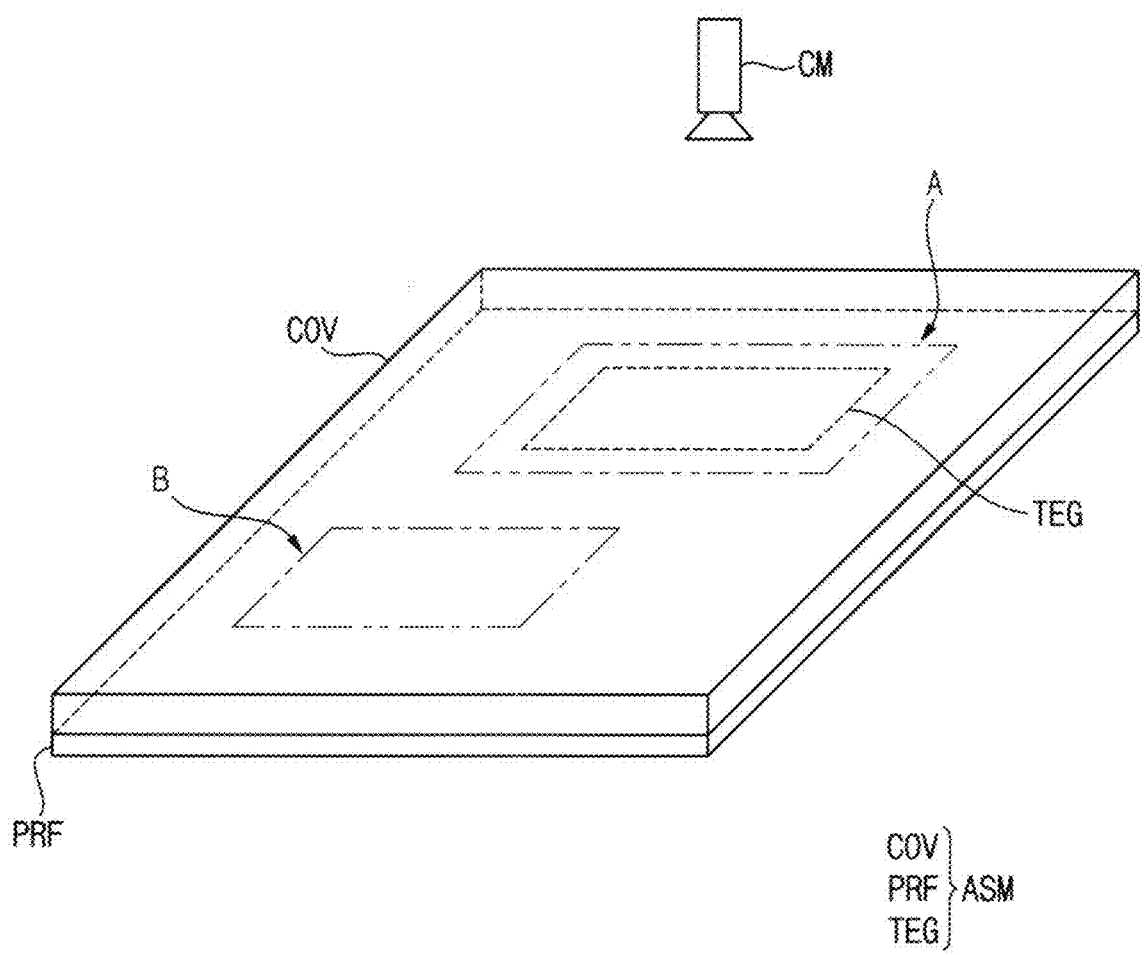
FIG. 2, FIG. 3, FIG. 4, FIG. 5, FIG. 6, FIG. 7, FIG. 8, FIG. 9, FIG. 10, FIG. 11, FIG. 12, FIG. 13, FIG. 14, FIG. 15, FIG. 16, FIG. 17, and FIG. 18 are diagrams explaining embodiments of the method of manufacturing the display device of FIG. 1.

FIG. 2 is a perspective view illustrating the cover substrate assembly ASM.

Referring to FIG. 2, the cover substrate assembly ASM may include the cover substrate COV, the protective film PRF, and the inspection pattern TEG. A camera CM may image (or capture an image of) the cover substrate assembly ASM to generate the image thereof.

The cover substrate COV may transmit light. In an embodiment, for example, the cover substrate COV may include glass or plastic. In an embodiment, the cover substrate COV may be a touch panel-integrated window including a cover window and a touch sensing layer disposed under the cover window. The touch sensing layer may include a transparent conductive material.

The protective film PRF may be attached to the lower surface of the cover substrate COV. The protective film PRF may protect the cover substrate COV from impact, impurities, etc. In an embodiment, the protective film PRF may protect the lower surface of the touch sensing layer. The protective film PRF may reflect or refract light. Accordingly, the image captured by the camera CM may be distorted. The protective film PRF may be removed, and thus the lower surface of the cover substrate COV may be exposed. The display panel including pixels may be attached to the lower surface of the cover substrate COV.

In an embodiment, the inspection pattern TEG may be disposed on an upper surface of the protective film PRF. In such an embodiment, the inspection pattern TEG may be disposed between the cover substrate COV and the protective film PRF. Although FIG. 2 illustrates an embodiment where the cover substrate assembly ASM includes a single inspection pattern TEG, the invention is not limited thereto. In an alternative embodiment, for example, the cover substrate assembly ASM may include a plurality of inspection patterns.

Figure 3:
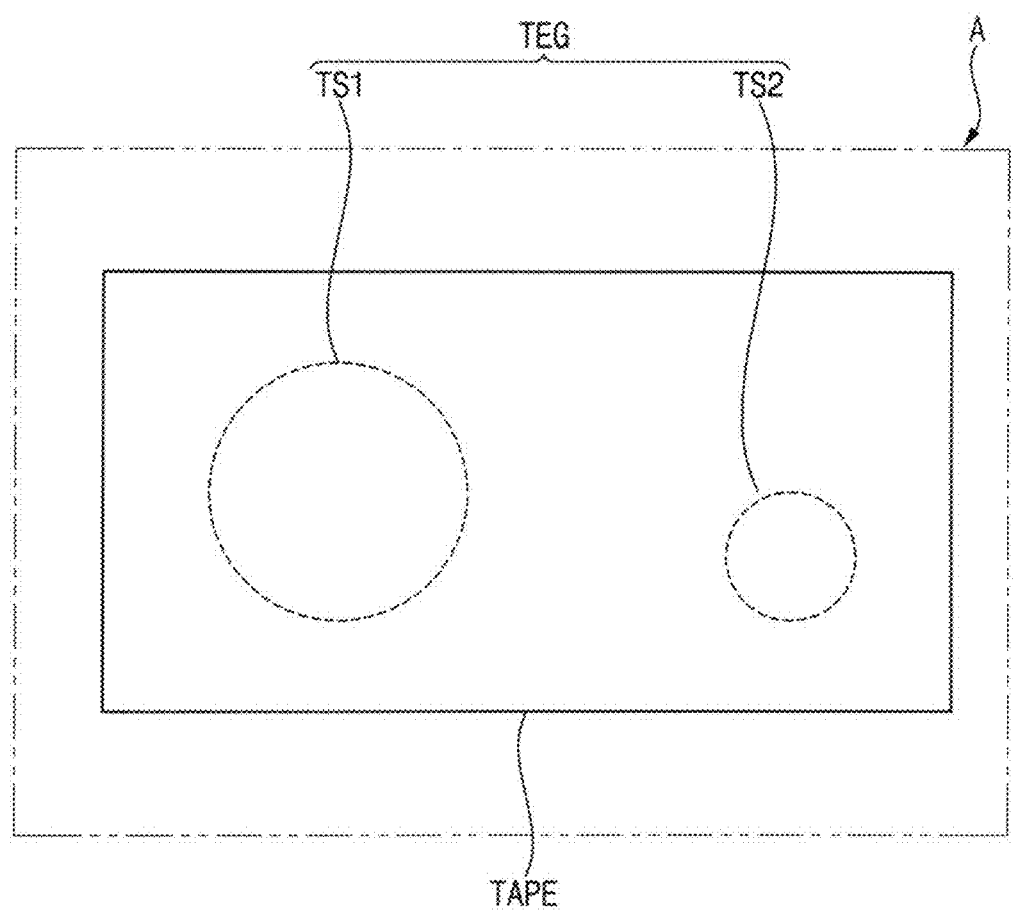
Figure 4:
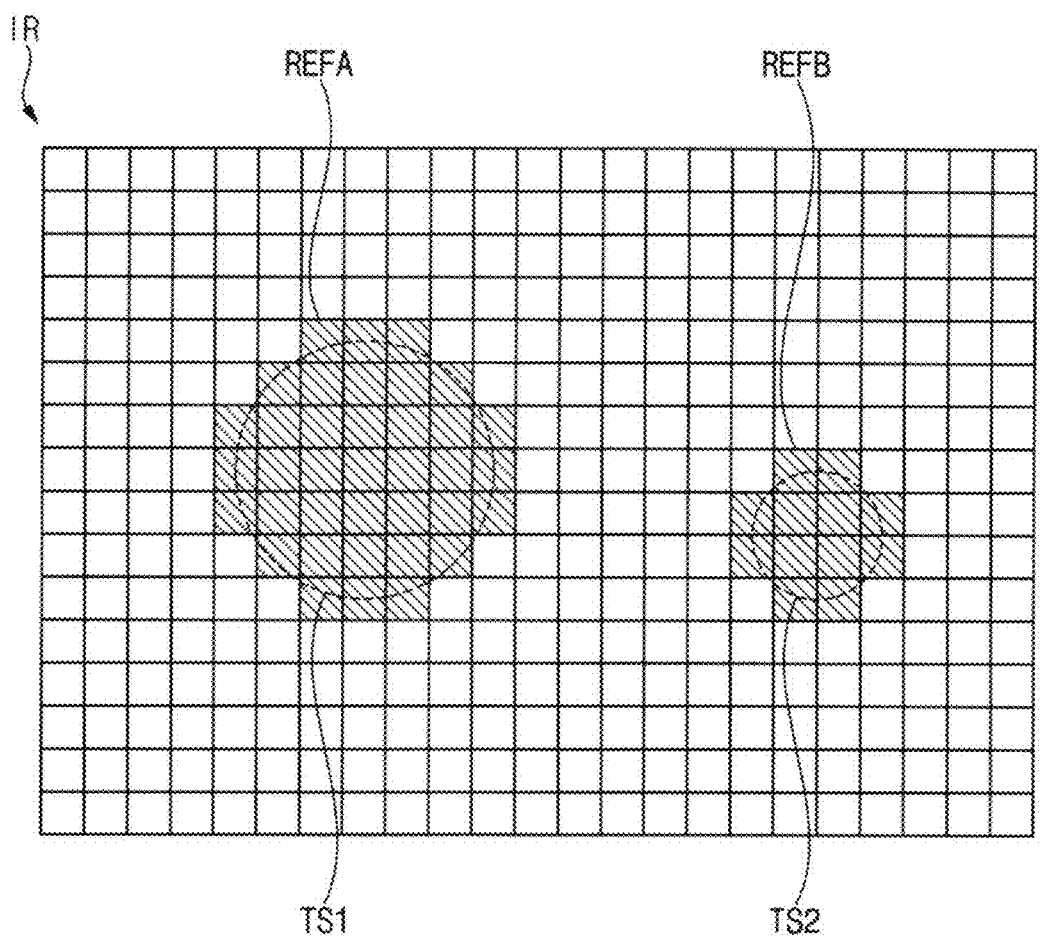
Figure 5:
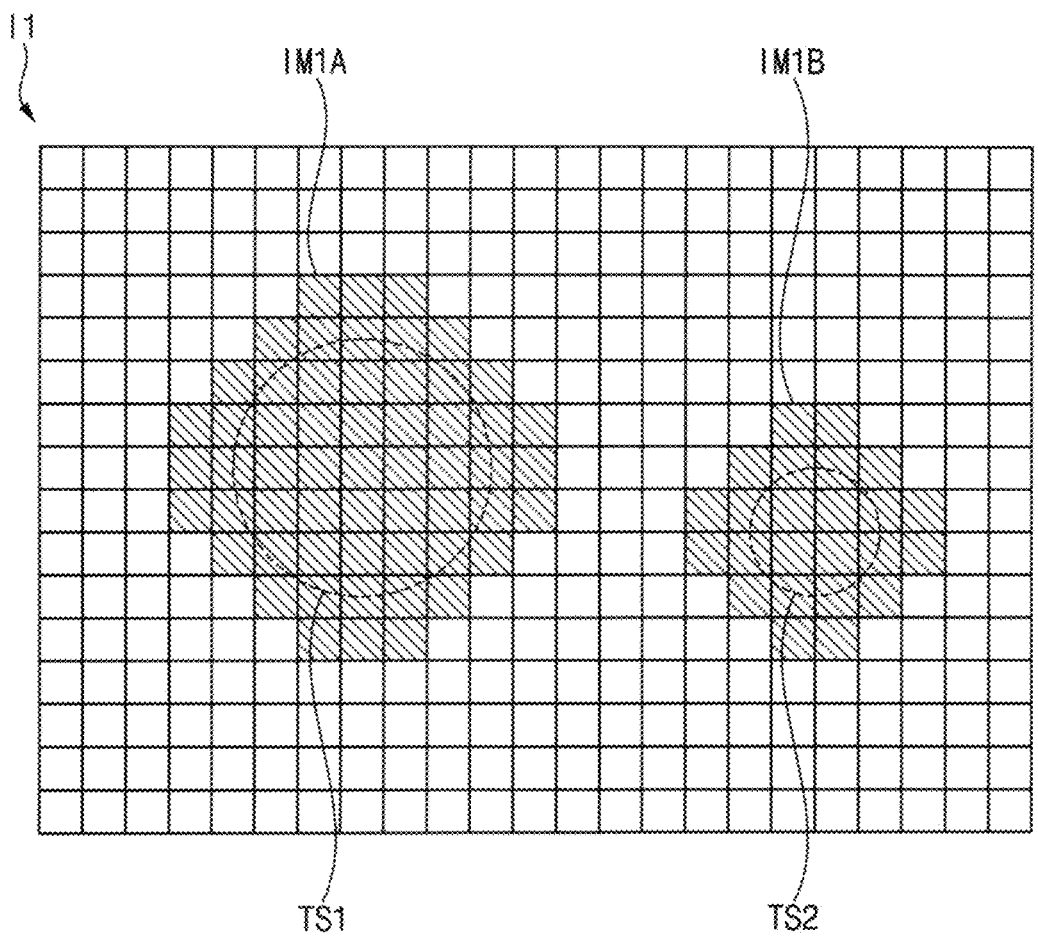
Figure 6:
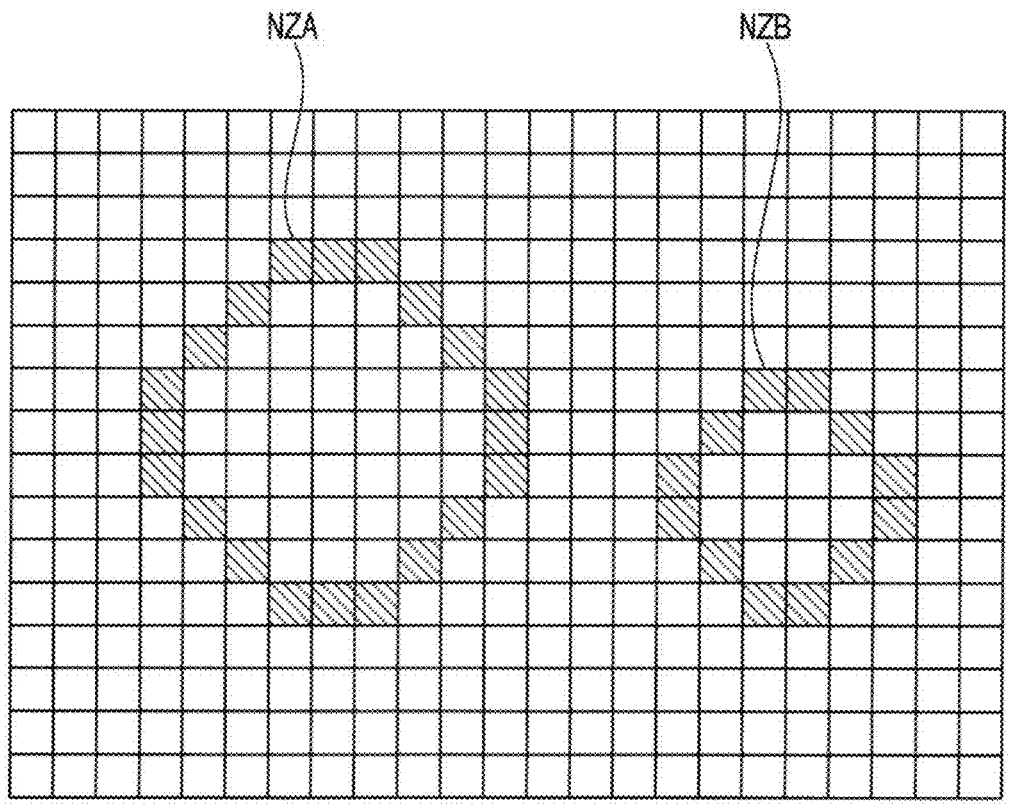
Figure 7:
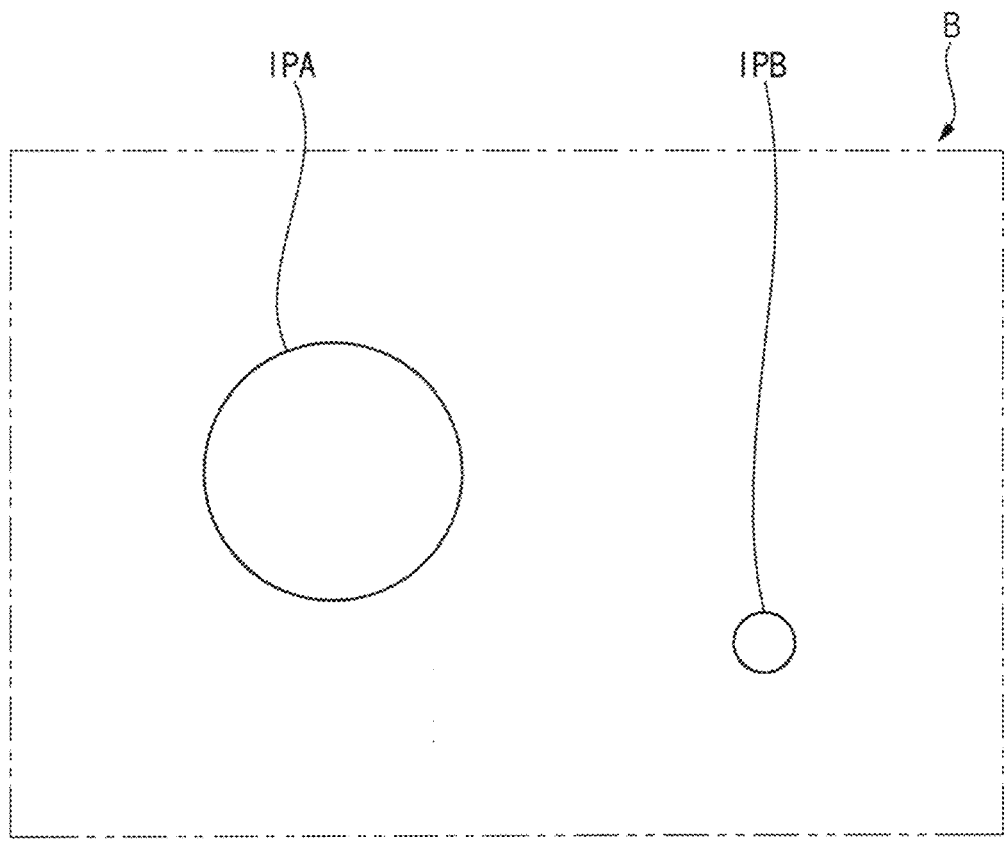
Figure 8:
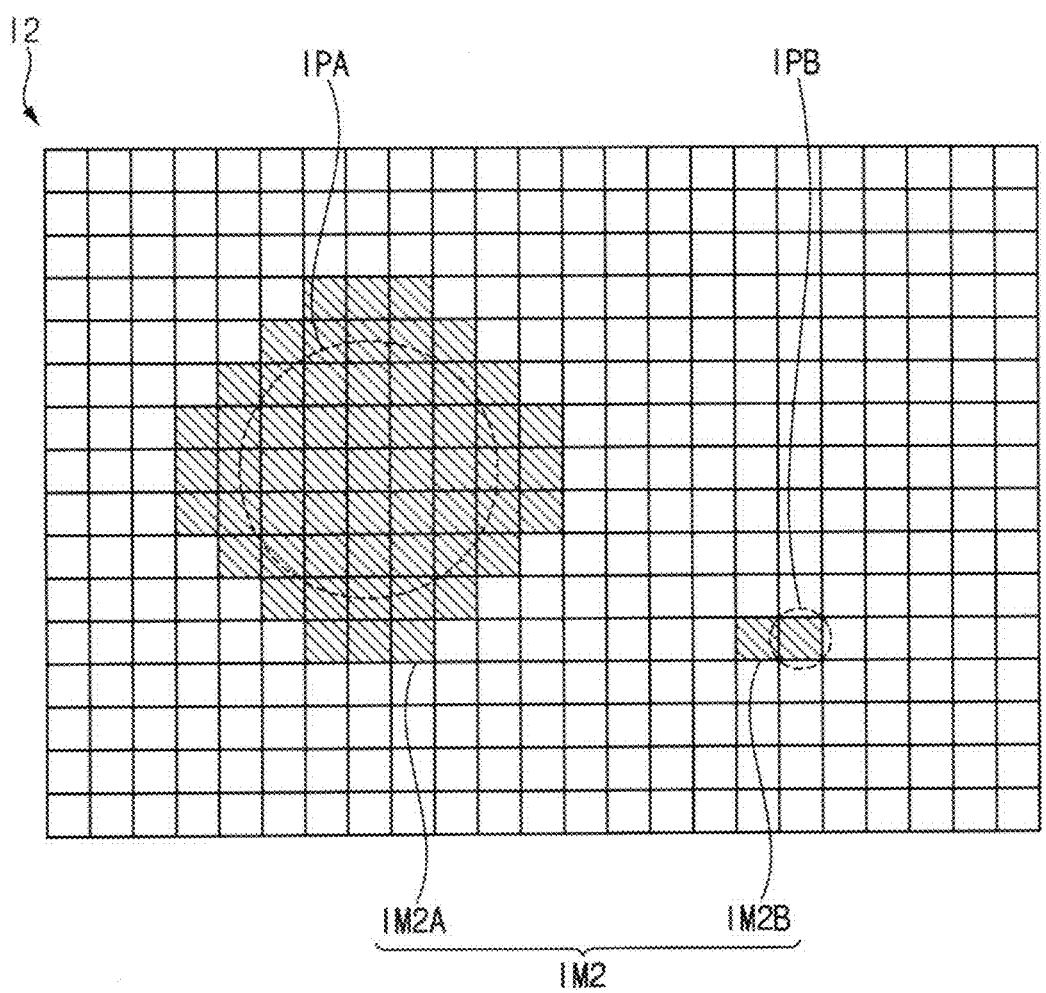
Figure 9:
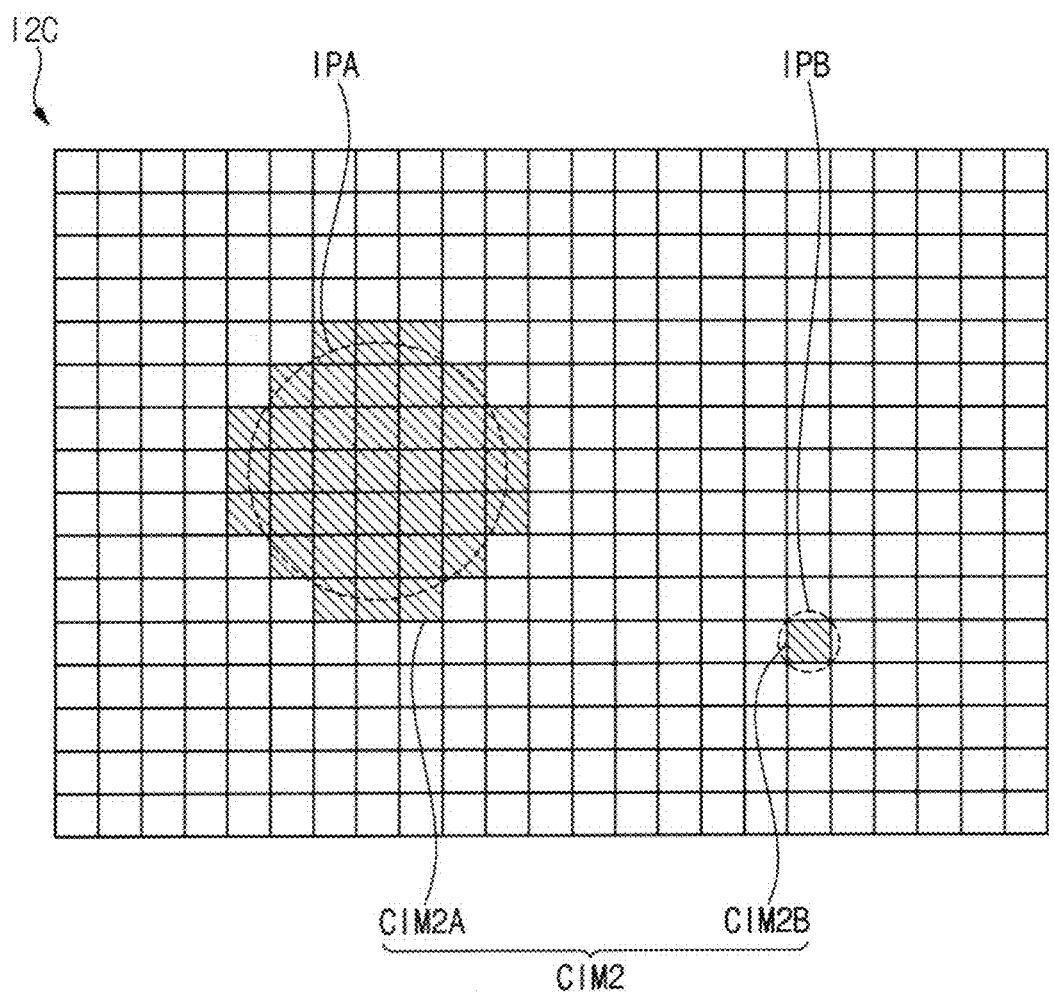

FIG. 3, FIG. 4, FIG. 5, FIG. 6, FIG. 7, FIG. 8, and FIG. 9 are diagrams illustrating an embodiment of the method of manufacturing the display device according to an embodiment. FIG. 3 is an enlarged plan view of an area A of FIG. 2. FIG. 4 is a diagram illustrating the reference image IR obtained by imaging the inspection pattern TEG of FIG. 3. FIG. 5 is a diagram illustrating the first image I1 obtained by imaging the inspection pattern TEG of FIG. 3. FIG. 6 is a diagram explaining obtaining the noise data by comparing the reference image IR and the first image I1 (S130 in FIG. 1). FIG. 7 is an enlarged plan view of an area B of FIG. 2. FIG. 8 is a diagram illustrating the second image I2 obtained by imaging the cover substrate assembly ASM. FIG. 9 is a diagram illustrating the corrected image I2C obtained by reflecting the noise data in the second image I2.

Referring to FIG. 3, in an embodiment, the inspection pattern TEG may include a first size inspection pattern TS1 and a second size inspection pattern TS2.

An area of the first size inspection pattern TS1 may be different from an area of the second size inspection pattern TS2. In an embodiment, the first size inspection pattern TS1 may have a circular shape having a first radius in a plan view, and the second size inspection pattern TS2 may have a circular shape having a second radius smaller than the first radius in a plan view.

The first size inspection pattern TS1 and the second size inspection pattern TS2 may be provided or formed by a method known in the art. In an embodiment, the first size inspection pattern TS1 and the second size inspection pattern TS2 may be formed on the upper surface of the protective film PRF by an inkjet method. In an alternative embodiment, a tape TAPE including the first size inspection pattern TS1 and the second size inspection pattern TS2 may be attached to the upper surface of the protective film PRF.

Although FIG. 3 illustrates an embodiment in which the inspection pattern TEG includes the first size inspection pattern TS1 and the second size inspection pattern TS2, the number of inspection patterns is not limited thereto. In an alternative embodiment, for example, the inspection pattern TEG may include first to $n^{th}$ (n is a natural number equal to or greater than 3) size inspection patterns, each having different areas from each other.

Referring to FIG. 4, the reference image IR may be an image obtained by imaging the inspection pattern TEG through the upper surface of the cover substrate COV. In such an embodiment, the protective film PRF may not be attached under the cover substrate COV. Accordingly, the reference image IR may not be affected by image distortion caused by the protective film PRF.

In the reference image IR, the first size inspection pattern TS1 may have a first reference area REFA and the second size inspection pattern TS2 may have a second reference area REFB.

Referring to FIG. 5, the first image I1 may be obtained by imaging the inspection pattern TEG through the top surface of the cover substrate COV. Accordingly, the first image I1 may be affected by the image distortion caused by the protective film PRF.

In the first image I1, the first size inspection pattern TS1 may have a first inspection area IM1A and the second size inspection pattern TS2 may have a second inspection area IM1B.

Referring to FIG. 6, due to image distortion by the protective film PRF, the first reference area REFA of the first size inspection pattern TS1 may be different from the first inspection area IM1A, and the second reference area REFB of the second size inspection pattern TS2 may be different from the second inspection area IM1B. A value corresponding to the difference between an area of the inspection pattern TEG in the reference image IR and an area of the inspection pattern TEG in the first image I1 may be defined as noise data.

In an embodiment, the noise data may include a first value corresponding to a first noise area difference NZA and a second value corresponding to a second noise area difference NZB. In such an embodiment, the first noise area difference NZA may be a difference between the first reference area REFA in the reference image IR and the first inspection area IM1A in the first image I1, and the second noise area difference NZB may be a difference between the second reference area REFB in the reference image IR and the second inspection area IM1B in the first image I1.

Referring to FIG. 7, the cover substrate COV may include a first impurity IPA and a second impurity IPB. The first impurity IPA and the second impurity IPB may be dust, moisture, or gas, for example. An area of the first impurity IPA may be greater than an area of the second impurity IPB.

Referring to FIG. 8, the second image I2 may be obtained by imaging the cover substrate assembly ASM from the upper surface of the cover substrate COV including the first impurity IPA and the second impurity IPB.

In the second image I2, the first impurity IPA may have a first imaging defect area IM2A, and the second impurity IPB may have a second imaging defect area IM2B. The second image I2 may be affected by image distortion caused by the protective film PRF. Accordingly, the first imaging defect area IM2A may be different from the area of the first impurity IPA, and the second imaging defect area IM2B may be different from the area of the second impurity IPB. In an embodiment, the first imaging defect area IM2A may be larger than the area of the first impurity IPA, and the second imaging defect area IM2B may be larger than the area of the second impurity IPB.

Referring to FIG. 9, in an embodiment, the corrected image I2C may be obtained by reflecting the noise data in the second image I2. In such an embodiment, the corrected image I2C may be obtained by removing image distortion caused by the protective film PRF in the second image I2.

In an embodiment, obtaining the corrected image I2C of the first imaging defect area IM2A may include comparing the first imaging defect area IM2A with the first inspection area IM1A, and comparing the first imaging defect area IM2A with the second inspection area IM2B. In such an embodiment, any one of the first inspection area IM1A and the second inspection area IM2B may be equal to the first imaging defect area IM2A. In an embodiment, for example, the first inspection area IM1A may be equal to the first imaging defect area IM2A.

In an embodiment, when the first inspection area IM1A and the first imaging defect area IM2A are substantially the same as each other, the first imaging defect area IM2A may be corrected by reflecting the first noise area difference NZA. In an embodiment, for example, the first imaging defect area IM2A may be reduced by the first noise area difference NZA.

In an embodiment, the first inspection area IM1A may be different from the first imaging defect area IM1A, and the second inspection area IM1B may be different from the second imaging defect area IM1B.

In such an embodiment, after obtaining an area correction value proportional to an area difference between the first inspection area IM1A and the first imaging defective area IM2A, a corrected area difference may be obtained by reflecting the area correction value to the first noise area difference NZA. In an embodiment, for example, the area correction value may be a value obtained by dividing the first imaging defect area IM2A by the first inspection area IM1A, and the corrected area difference may be a value obtained by multiplying the first noise area difference NZA by the area correction value.

After obtaining the corrected area difference, the first imaging defect area IM2A may be corrected by reflecting the corrected area difference. In an embodiment, for example, the first imaging defect area IM2A may be reduced by the corrected area difference.

After obtaining the corrected image I2C, the defects of the cover substrate COV may be detected from the corrected image I2C.

In an embodiment, a defect area CIM2 may be obtained by detecting the defects from the corrected image I2C. In an embodiment, for example, in the corrected image I2C, the first impurity IPA may have a first defect area CIM2A, and the second impurity IPB may have a second defect area CIM2B.

Each of the first defect area CIM2A and the second defect area CIM2B may be compared with a reference defect area. When at least one of the first defect area CIM2A and the second defect area CIM2B is larger than the reference defect area, the cover substrate COV may be classified as a defective cover substrate.

Figure 10:
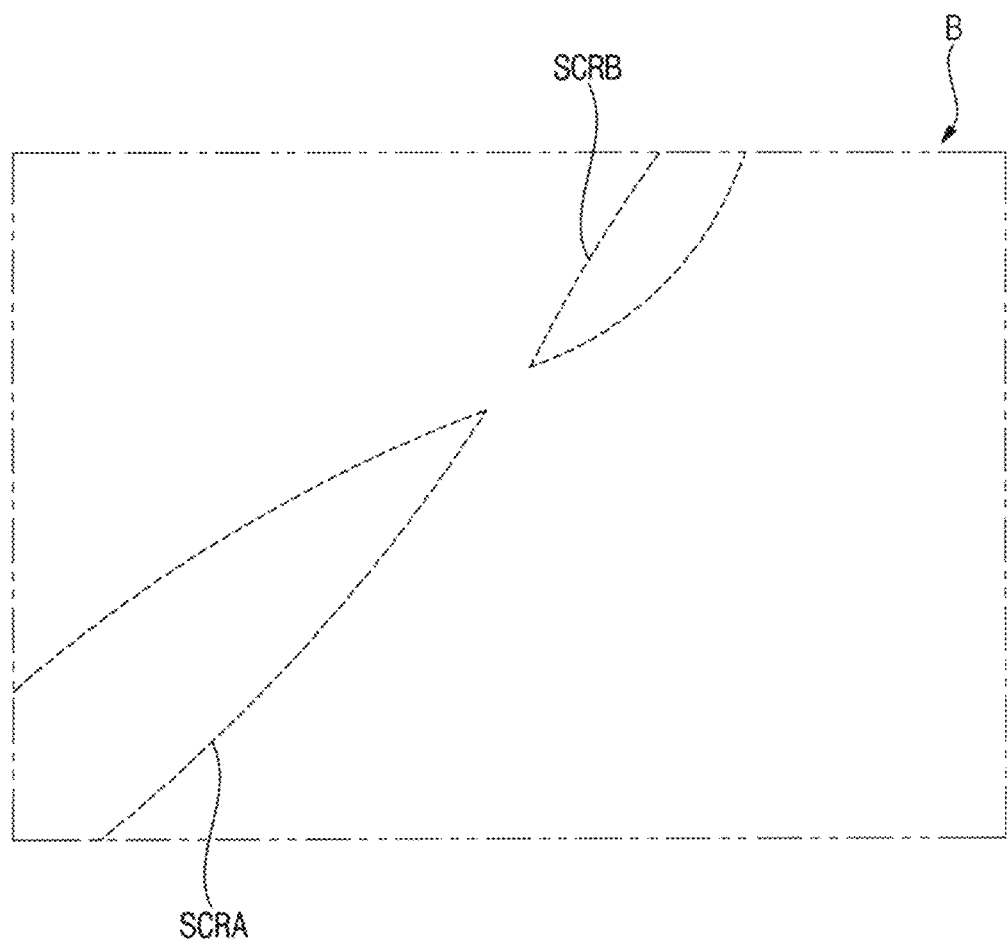
Figure 11:
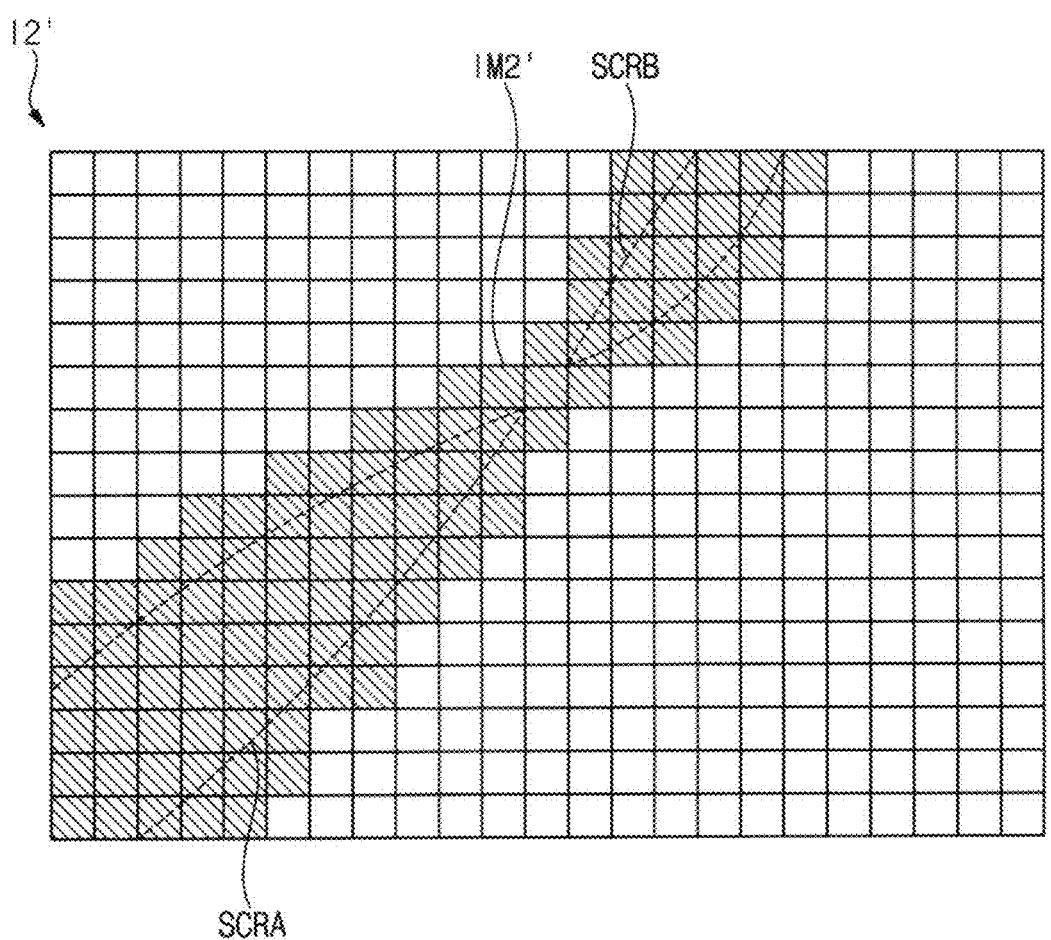
Figure 12:
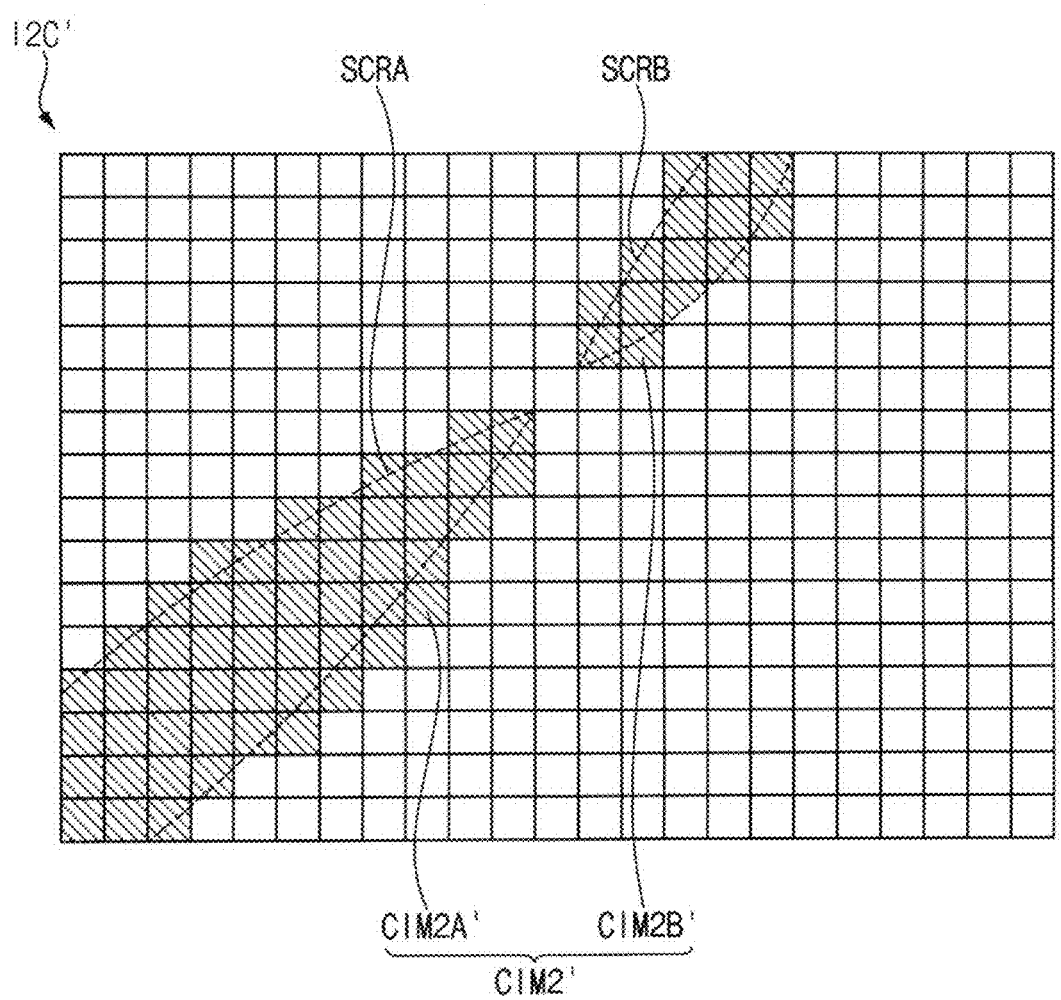

FIG. 10, FIG. 11, and FIG. 12 are diagrams illustrating the method of manufacturing the display device according to an alternative embodiment. FIG. 10 is an enlarged plan view of an area B of FIG. 2. FIG. 11 is a diagram illustrating the second image I2' obtained by imaging the cover substrate assembly ASM. FIG. 12 is a diagram illustrating the corrected image I2C' obtained by reflecting the noise data in the second image I2'. Any repetitive detailed description of the same or like elements as those described above with reference to FIG. 1 to FIG. 9 will hereinafter be omitted or simplified.

Referring to FIG. 10, the cover substrate COV may include a first scratch defect SCRA and a second scratch defect SCRB. The first and second scratch defects SCRA and SCRB may be damage due to scratching of the cover substrate COV. The first scratch defect SCRA may be spaced apart from the second scratch defect SCRB.

Referring to FIG. 11, the second image I2' may be obtained by imaging the cover substrate assembly ASM through the upper surface of the cover substrate COV including the first scratch defect SCRA and the second scratch defect SCRB.

In the second image I2', the first scratch defect SCRA and the second scratch defect SCRB may have a imaging defect area IM2'. The second image I2' may be affected by image distortion caused by the protective film PRF. Accordingly, the imaging defect area IM2' may be different from areas of the first scratch defect SCRA and the second scratch defect SCRB. In an embodiment, the imaging defect area IM2' may be greater than sum of the area of the first scratch defect SCRA and the area of the second scratch defect SCRB, and accordingly, in the second image I2', the first scratch defect SCRA and the second scratch defect SCRB may not be effectively distinguished from each other.

Referring to FIG. 12, in an embodiment, the corrected image I2C' may be obtained by reflecting (or removing) the noise data in the second image I2'. In such an embodiment, the corrected image I2C' may be obtained by removing image distortion caused by the protective film PRF in the second image I2'.

In the corrected image I2C', the first scratch defect SCRA may have a first defect area CIM2A' of a defect area CIM2', and the second scratch defect SCRB may have a second defect area CIM2B' of the defect area CIM2'. The first defect area CIM2A' may be substantially the same as an area of the first scratch defect SCRA, and the second defect area CIM2B' may be substantially the same as an area of the second scratch defect SCRB. Accordingly, in the corrected image I2C', the first scratch defect SCRA and the second scratch defect SCRB may be clearly distinguished from each other.

Figure 13:
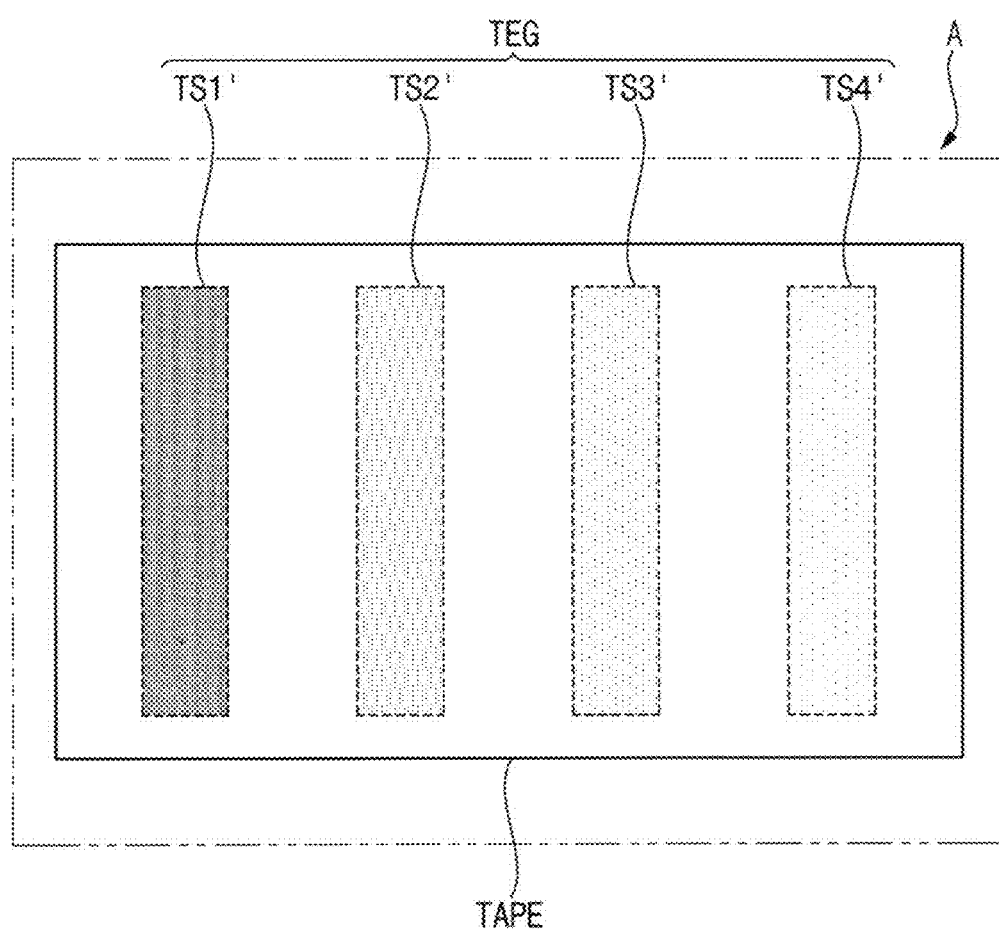

FIG. 13, FIG. 14, FIG. 15, FIG. 16, FIG. 17, and FIG. 18 are diagrams illustrating the method of manufacturing the display device according to another alternative embodiment. FIG. 13 is an enlarged plan view of the area A of FIG. 2. FIG.

Figure 15:
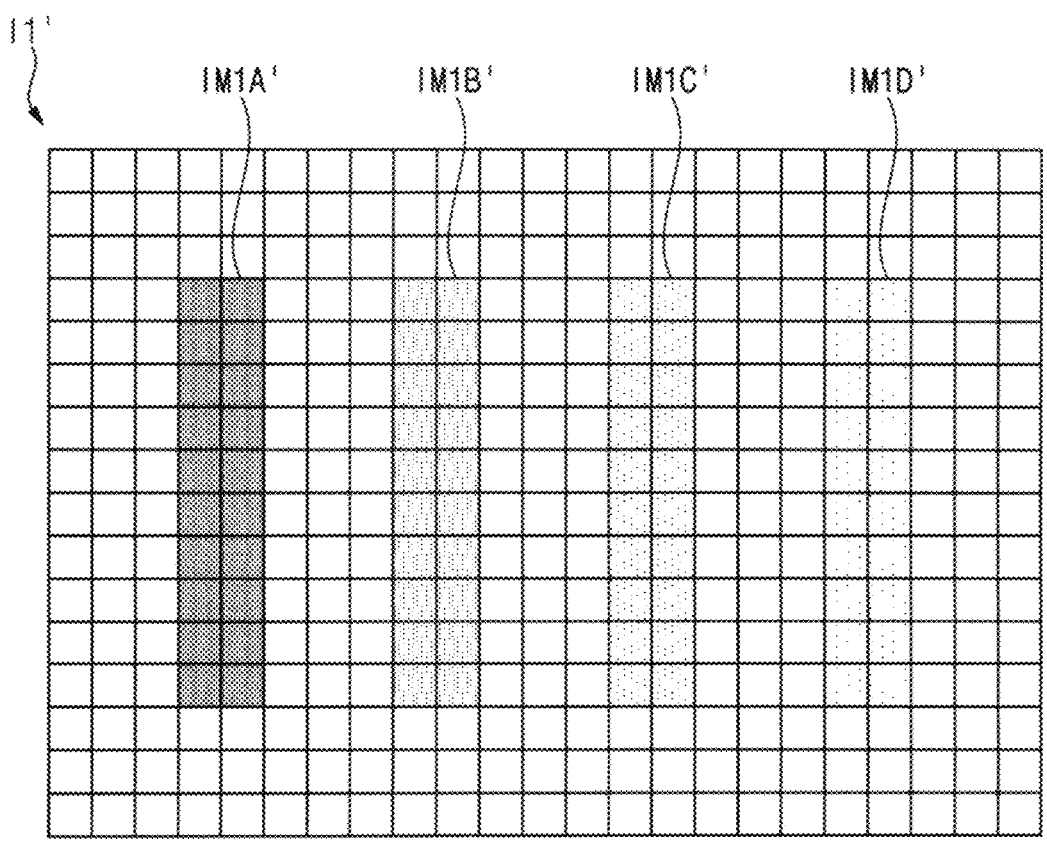
Figure 16:
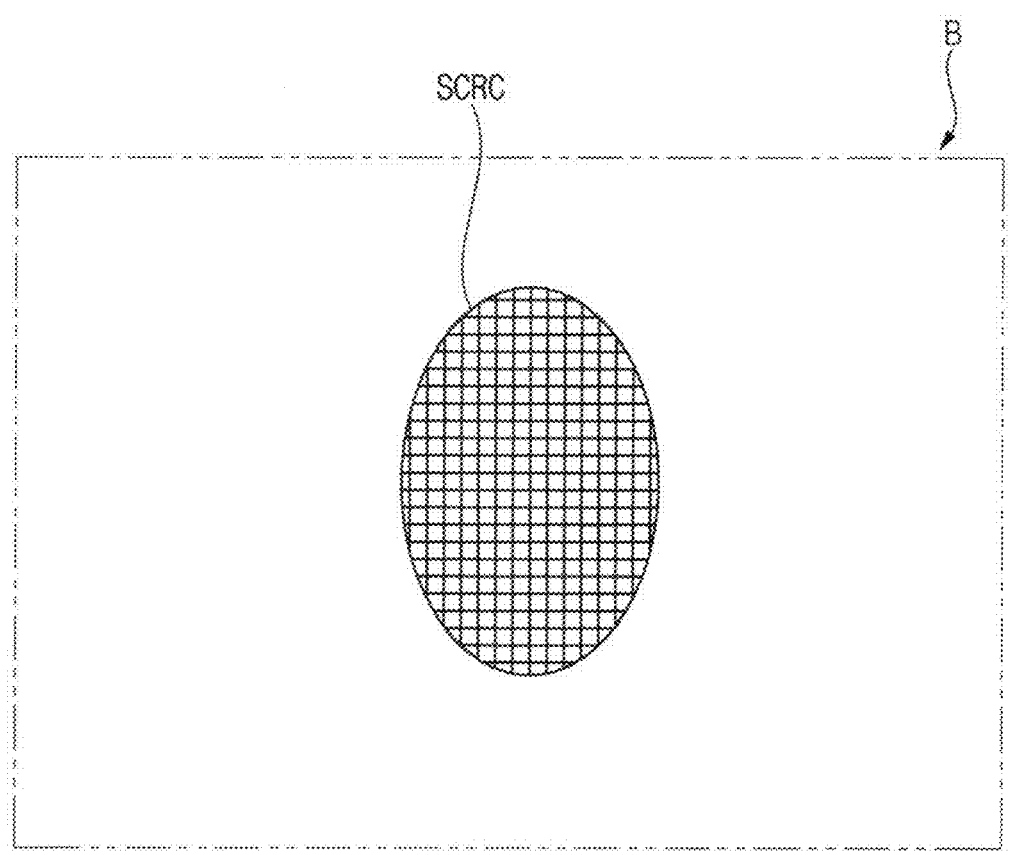
Figure 17:
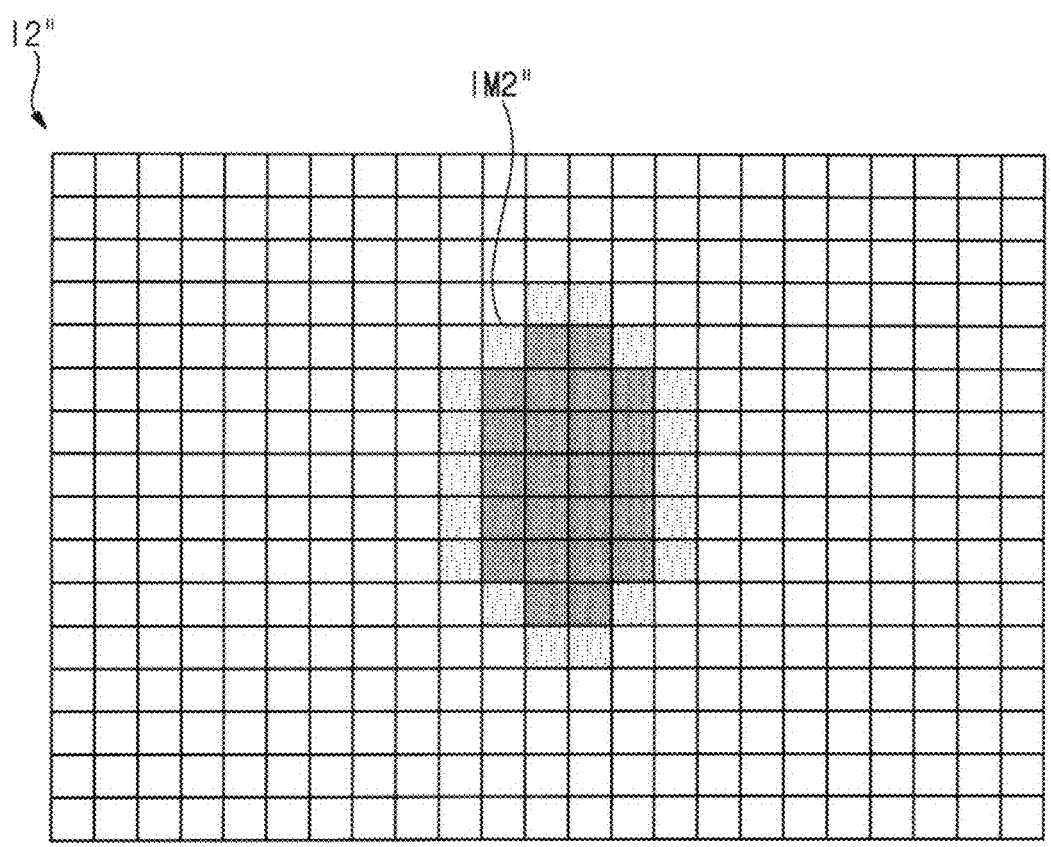
Figure 18:
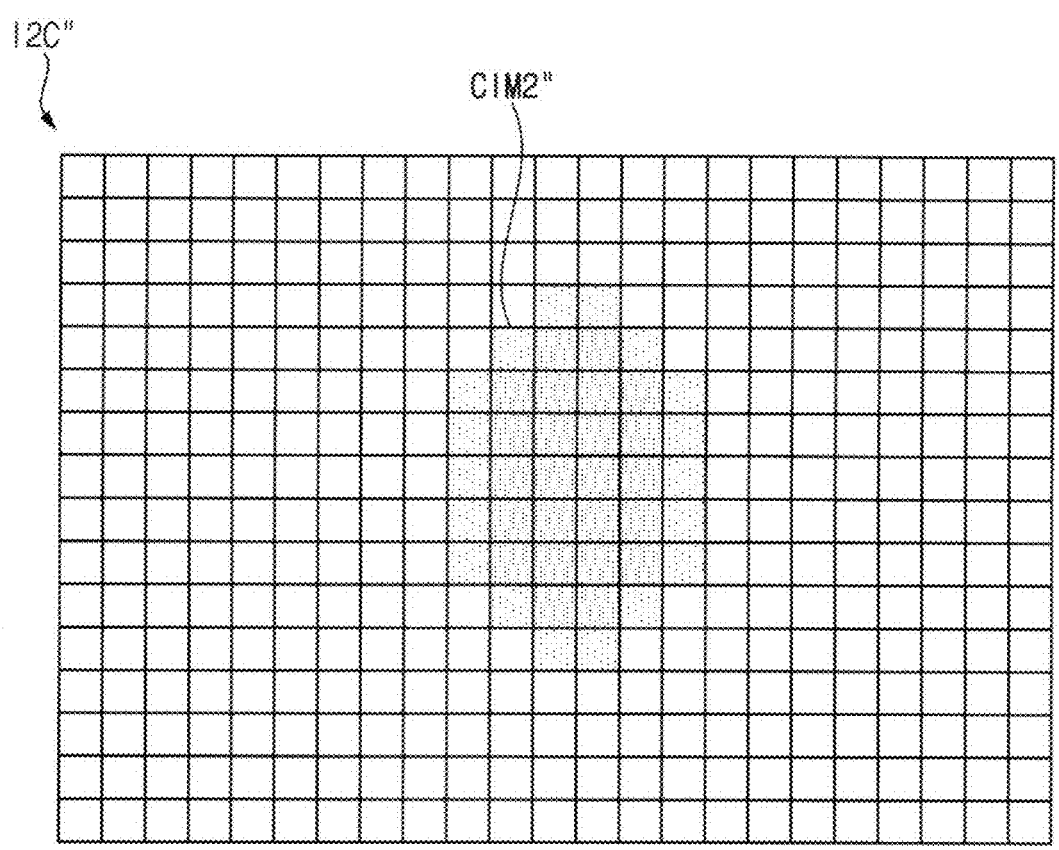

14 is a diagram illustrating the reference image IR' obtained by imaging the inspection pattern TEG of FIG. 13. FIG. 15 is a diagram illustrating the first image I1' obtained by imaging the inspection pattern TEG of FIG. 13. FIG. 16 is a plan view enlarging the area B of FIG. 2. FIG. 17 is a diagram illustrating the second image I2" obtained by imaging the cover substrate assembly. FIG. 18 is a diagram illustrating the corrected image I2C" obtained by reflecting the noise data in the second image I2". Any repetitive detailed description of the same or like elements as those described above with reference to FIG. 1 to FIG. 12 will hereinafter be omitted or simplified.

Referring to FIG. 13, in an embodiment, the inspection pattern TEG may include a first grayscale inspection pattern TS1', a second grayscale inspection pattern TS2', a third grayscale inspection pattern TS3', and a fourth grayscale inspection pattern TS4'. Each of the first grayscale inspection pattern TS1', the second grayscale inspection pattern TS2', the third grayscale inspection pattern TS3', and the fourth grayscale inspection pattern TS4' may have different grayscales from each other.

The first to fourth grayscale inspection patterns TS1', TS2', TS3' and TS4' may be formed by a method known in the art. In an embodiment, the first to fourth grayscale inspection patterns TS1', TS2', TS3' and TS4' may be formed on the upper surface of the protective film PRF using an inkjet method. In an alternative embodiment, a tape TAPE including the first to fourth grayscale inspection patterns TS1', TS2', TS3' and TS4' may be attached to the upper surface of the protective film PRF.

Although FIG. 13 illustrates an embodiment in which the inspection pattern TEG includes the first to fourth grayscale inspection patterns TS1', TS2', TS3' and TS4', but the number of the grayscale inspection patterns included in the inspection pattern TEG is not limited thereto. In an embodiment, for example, the inspection pattern TEG may include first to $m^{th}$ (m is a natural number equal to or greater than 2) grayscale inspection patterns having different grayscales from each other.

Figure 14:
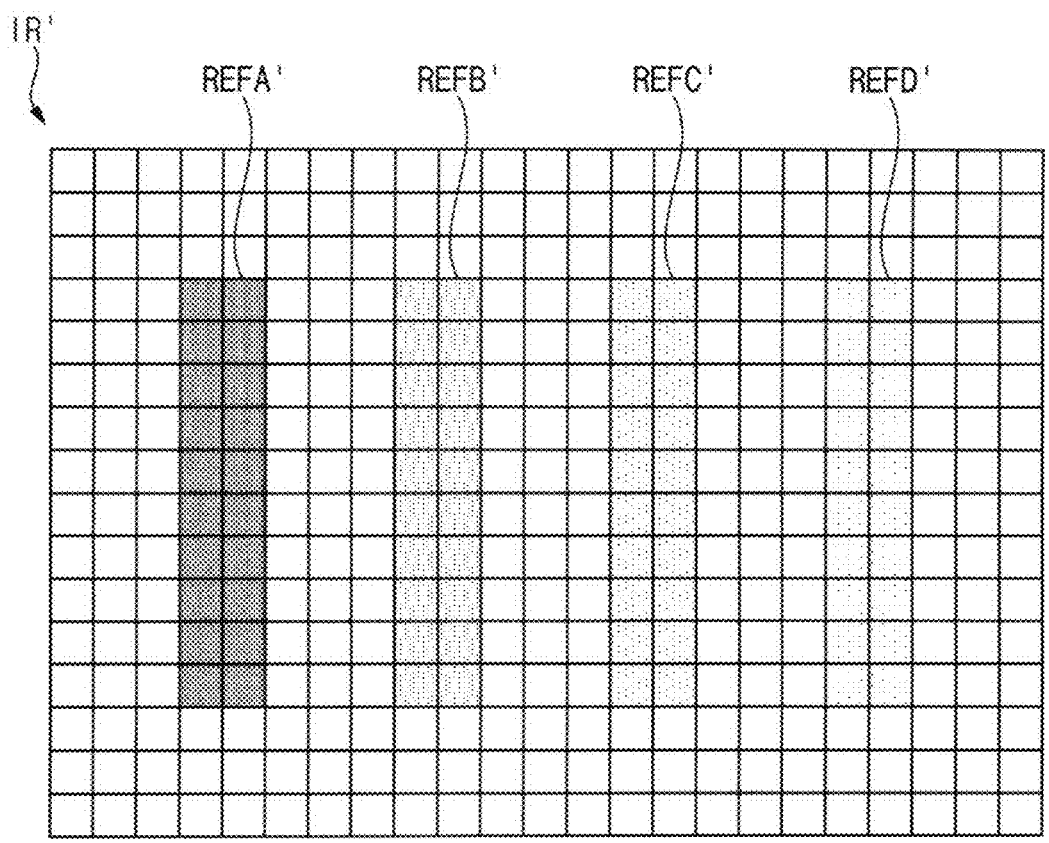

Referring to FIG. 14, the reference image IR' may be an image obtained by imaging the inspection pattern TEG through the upper surface of the cover substrate COV. In such an embodiment, the protective film PRF may not be attached under the cover substrate COV. Accordingly, the reference image IR' may not be affected by image distortion caused by the protective film PRF.

In the reference image IR', the first grayscale inspection pattern TS1' may have a first reference grayscale REFA', the second grayscale inspection pattern TS2' may have a second reference grayscale REFB', the third grayscale inspection pattern TS3' may have a third reference grayscale REFC', and the fourth grayscale inspection pattern TS4' may have a fourth reference grayscale REFD'.

Referring to FIG. 15, the first image I1' may be obtained by imaging the inspection pattern TEG through the upper surface of the cover substrate COV. Accordingly, the first image I1' may be affected by image distortion caused by the protective film PRF.

In the first image I1', the first grayscale inspection pattern TS1' may have a first imaging grayscale IM1A', the second grayscale inspection pattern TS2' may have a second imaging grayscale IM1B', the third grayscale inspection pattern TS3' may have a third imaging grayscale IM1C', and the fourth grayscale inspection pattern TS4 may have a fourth imaging grayscale IM1D'.

By image distortion caused by the protective film PRF, the first imaging grayscale IM1A' may be different from the first reference grayscale REFA', the second imaging grayscale IM1B' may be different from the second reference grayscale REFB', the third imaging grayscale IM1C' may be different from the third reference grayscale REFC', and the fourth imaging grayscale IM1D' may be different from the fourth reference grayscale REFD'. A value corresponding to a grayscale difference between the reference image IR' and the first image I1' may be defined as noise data. The noise data may include a value corresponding to a noise grayscale difference which is a difference between the reference grayscales REFA', REFB', REFC', and REFD' and the imaging grayscales IM1A', IM1B', IM1C', and IM1D'.

Referring to FIG. 16, the cover substrate COV may include a pressing defect SCRC. The pressing defect SCRC may be a defect caused by deformation of the cover substrate COV by external force. When the camera CM captures the pressing defect SCRC, a grayscale of an area where the pressing defect SCRC occurs may be different from a grayscale of an area where the pressing defect SCRC does not occur. In addition, the grayscale of the area where the pressing defect SCRC occurs may have a grayscale having a value proportional to a degree to which the cover substrate C?OV is deformed due to the pressing defect SCRC.

Referring to FIG. 17, the second image I2" may be obtained by imaging the cover substrate assembly ASM through the upper surface of the cover substrate COV including the pressing defect SCRC.

In the second image I2", the pressing defect SCRC may have a imaging grayscale distribution IM2". Since the second image I2" is affected by image distortion caused by the protective film PRF, the imaging grayscale distribution IM2" may not be proportional to the degree to which the cover substrate COV is deformed due to the pressing defect SCRC.

Referring to FIG. 18, the corrected image I2C" may be obtained by reflecting the noise data in the second image I2". In such an embodiment, the corrected image I2C" may be obtained by removing image distortion caused by the protective film PRF in the second image I2".

In an embodiment, obtaining the corrected image I2C" may include obtaining the imaging grayscale distribution IM2" from the second image I2" and obtaining the corrected image I2C" having a corrected grayscale distribution CIM2" by reflecting the noise grayscale difference in the imaging grayscale distribution IM2".

The corrected grayscale distribution CIM2" may be compared with a normal grayscale range (or a reference grayscale range), and when a grayscale defect having a grayscale outside the normal grayscale range is detected in the corrected grayscale distribution CIM2", the cover substrate COV may be classified as a defective cover substrate.

Figure 19:
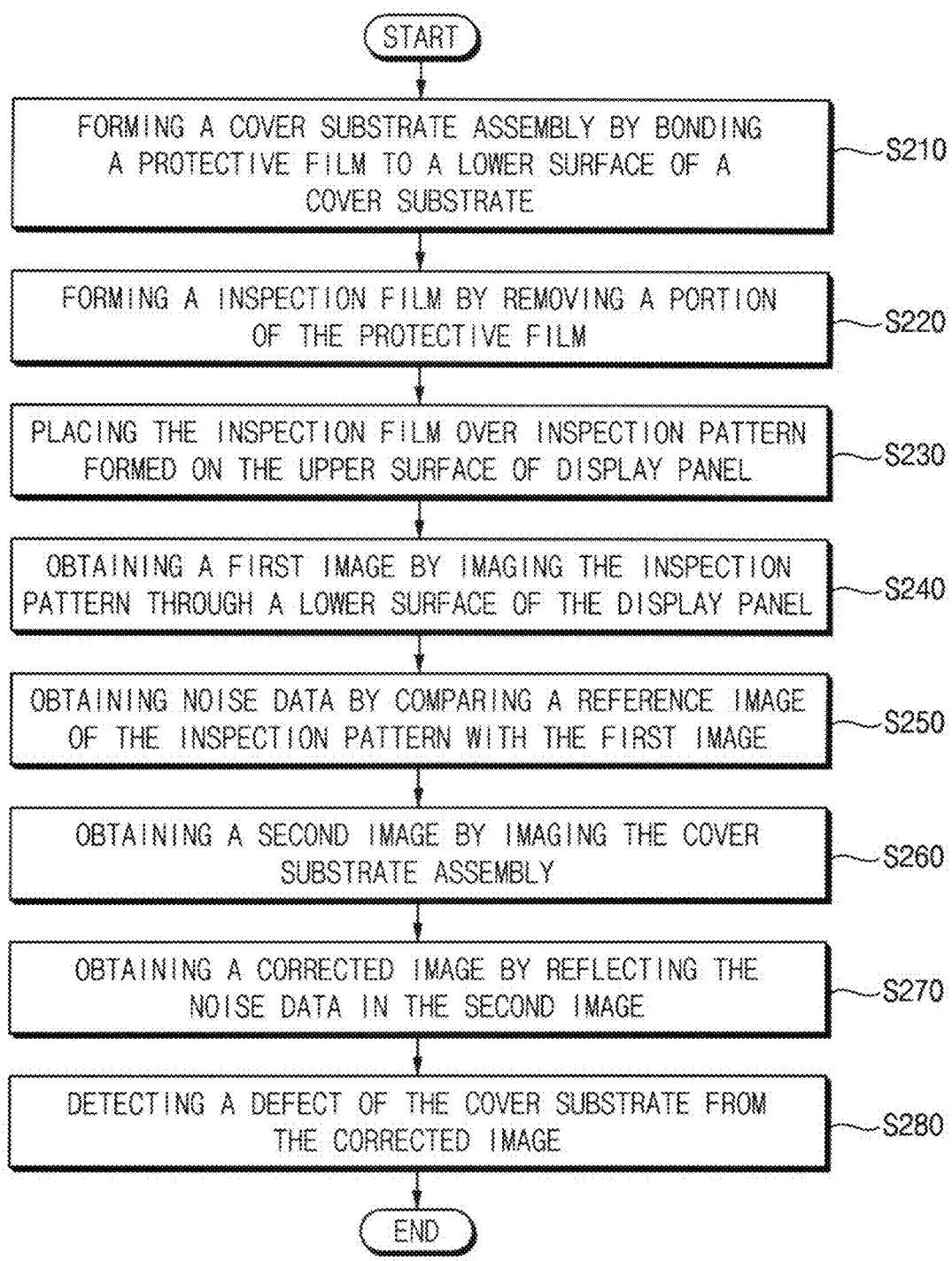
FIG. 19 is a flowchart illustrating a method of manufacturing a display device according to an alternative embodiment.

FIG. 19 is a flowchart illustrating a method of manufacturing a display device according to an alternative embodiment.

Referring to FIG. 19, a method of manufacturing a display device according to another embodiment of the invention may include forming a cover substrate assembly by bonding a protective film to a lower surface of a cover substrate (S210), forming an inspection film by removing a portion of the protective film (S220), placing (or disposing) the inspection film over inspection pattern formed (or provided) on the upper surface of a display panel (S230), obtaining a first image by imaging the inspection pattern through a lower surface of the display panel (S240), obtaining noise data by comparing a reference image of the inspection pattern with the first image (S250), obtaining a second image by imaging the cover substrate assembly (S260), obtaining a corrected image by reflecting the noise data in the second image (S270), and detecting a defect of the cover substrate from (or based on) the corrected image (S280).

Figure 20:
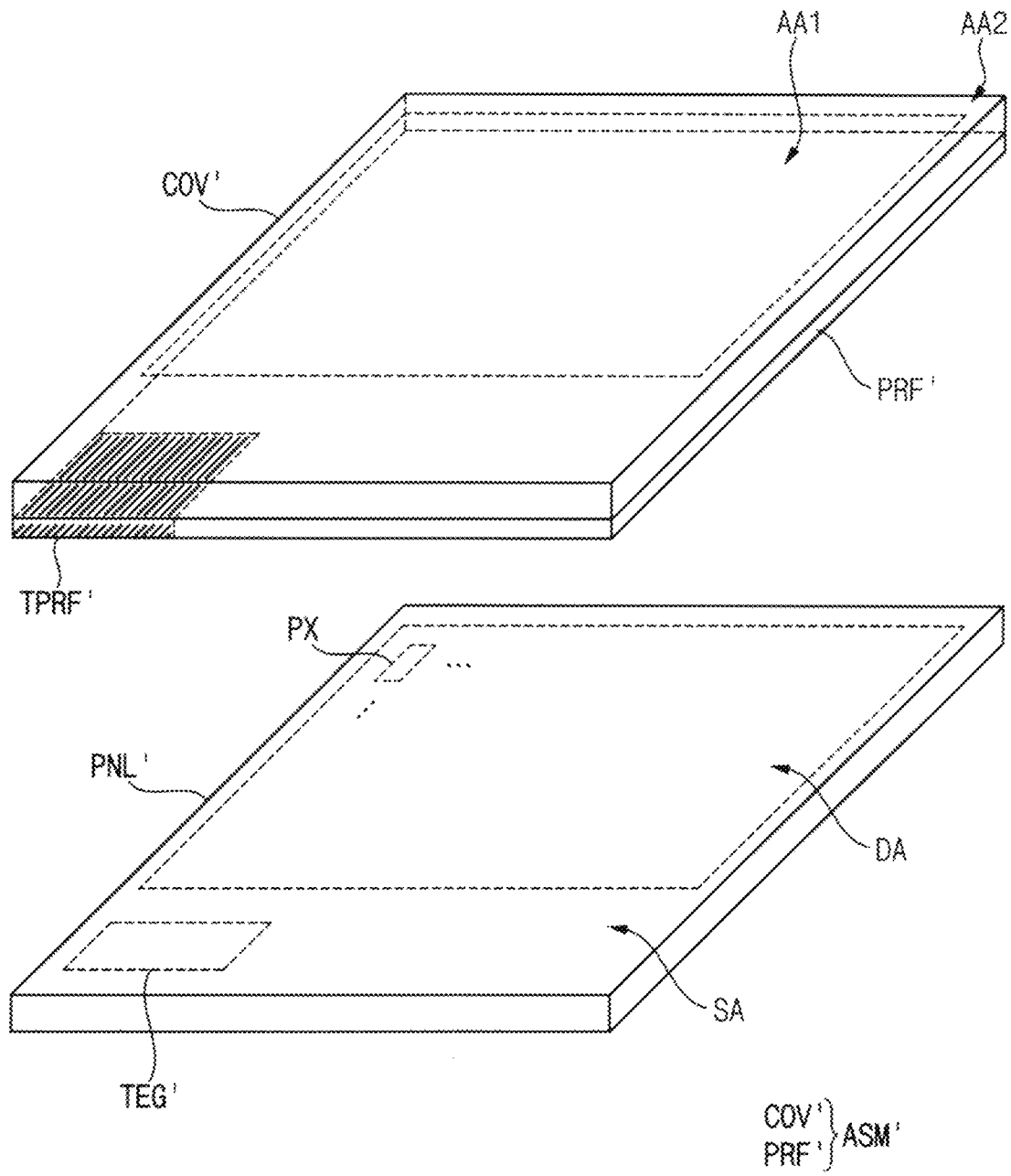
FIG. 20, FIG. 21, and FIG. 22 are diagrams explaining the method of manufacturing the display device of FIG. 19.
Figure 21:
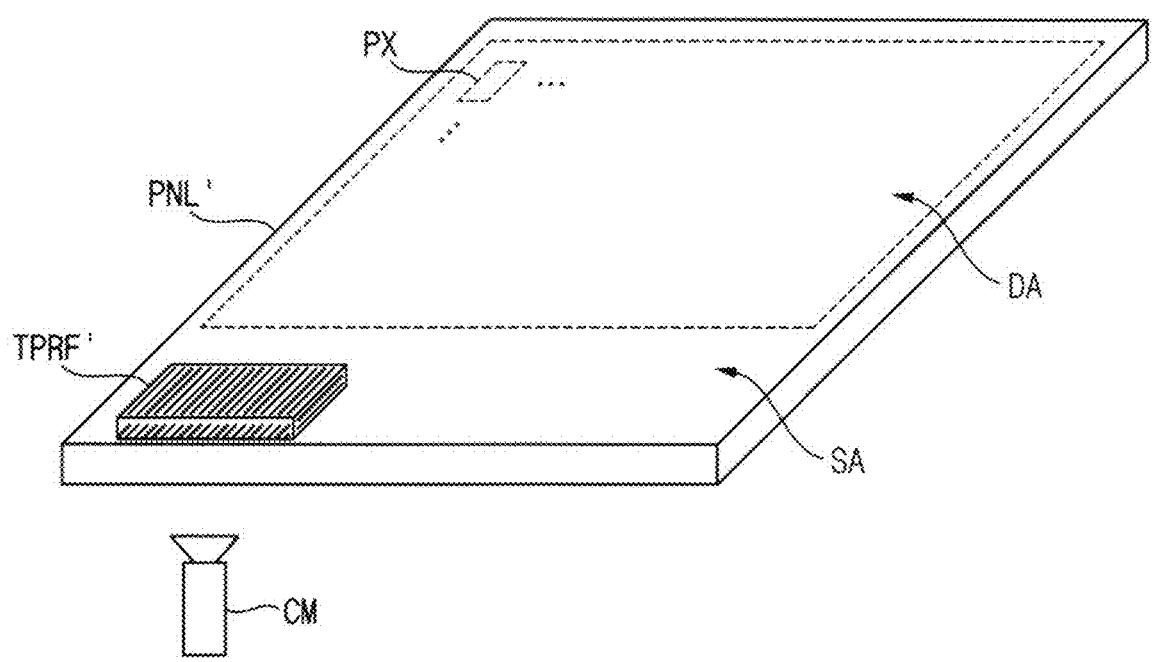
Figure 22:
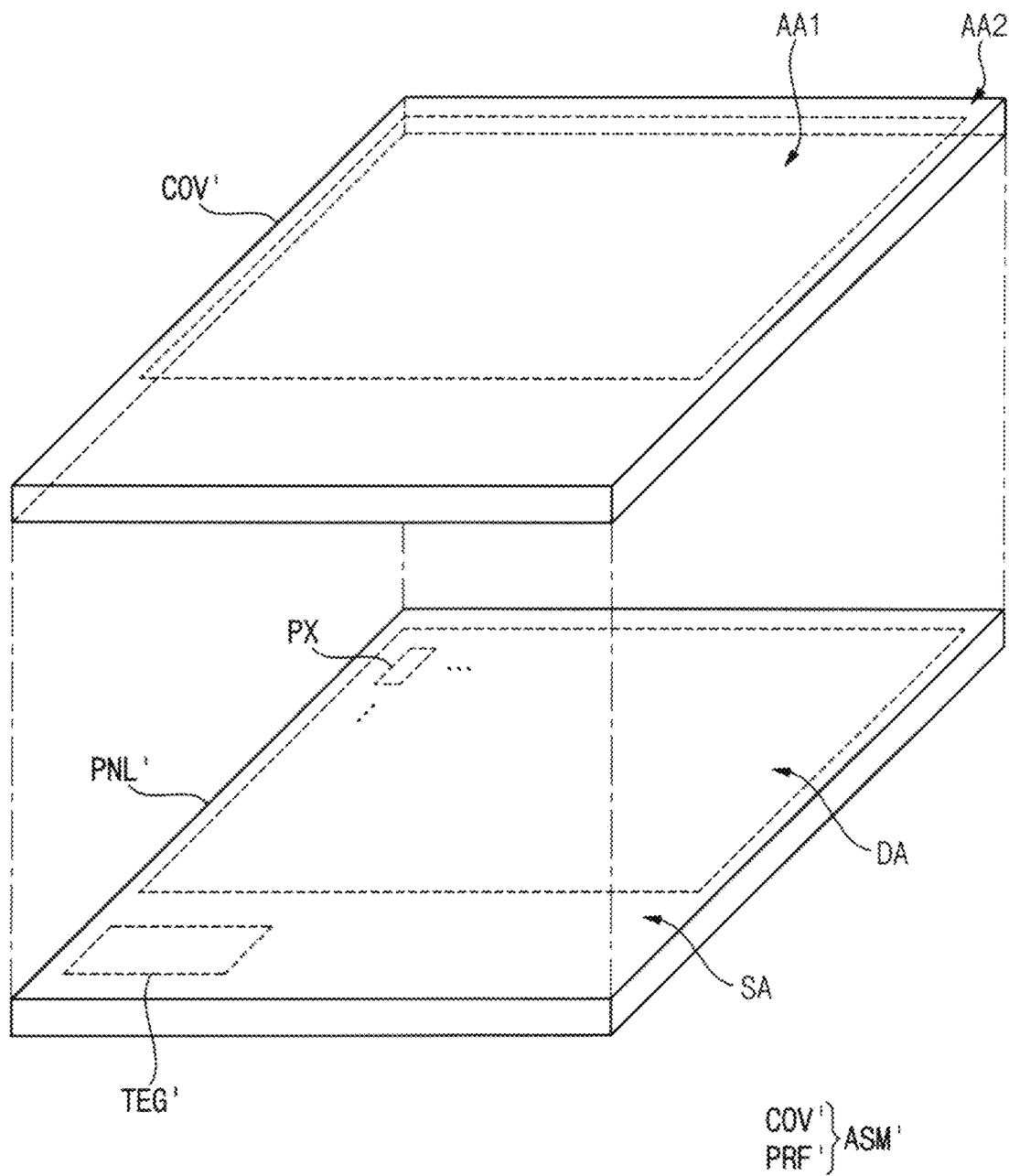

FIG. 20, FIG. 21, and FIG. 22 are diagrams explaining the method of manufacturing the display device of FIG. 19. Any repetitive detailed description of the same or like elements as those described above with reference to FIG. 1 to FIG. 18 will hereinafter be omitted or simplified.

Referring to FIG. 20, the cover substrate assembly ASM' may be formed by bonding the protective film PRF' to the lower surface of the cover substrate COV'. The cover substrate COV' may be substantially the same as the cover substrate COV described above with reference to FIG. 1 to FIG. 18. The protective film PRF' may be substantially the same as the protective film PRF described above with reference to FIG. 1 to FIG. 18.

The cover substrate COV' may include a first area AA1 and a second area AA2 surrounding the first area AA1. The first area AA1 may correspond to a display area DA of the display panel PNL', and the second area AA2 may correspond to a peripheral area SA of the display panel PNL'.

A portion of the protective film PRF' may be removed. In an embodiment, a portion overlapping the second area AA2 may be removed. The portion may be referred to as an inspection film TPRF'.

Referring to FIG. 21, the inspection film TPRF' may be disposed on or to overlap the inspection pattern TEG provided or formed on the upper surface of the display panel PNL'.

The display panel PNL' may include the display area DA and the peripheral area SA surrounding the display area DA. The inspection pattern TEG' may be disposed on the peripheral area SA. A pixel PX may be disposed in the display area DA. A driver for driving the pixel PX and the pad electrode electrically connected to the pixel PX may be disposed in the peripheral area SA.

The inspection pattern TEG' may be substantially the same as the inspection pattern TEG described above with reference to FIG. 1 to FIG. 18. The inspection pattern TEG may not overlap the driver and the pad electrode.

After disposing the inspection film TPRF' on the inspection pattern TEG, the first image may be obtained by imaging the inspection pattern TEG' through the lower surface of the display panel PNL'. The first image may be substantially the same as the first image I1 and I1' described with reference to FIG. 1 to FIG. 18. After obtaining the first image, the inspection film TPRF' may be removed.

Referring to FIG. 22, when the cover substrate COV' does not have defects, the protective film PRF' may be removed from the cover substrate assembly ASM' and then the display panel PNL' may be attached or bonded under (or to a lower surface of) the cover substrate COV'.

The invention should not be construed as being limited to the embodiments set forth herein. Rather, these embodiments are provided so that this disclosure will be thorough and complete and will fully convey the concept of the invention to those skilled in the art.

While the invention has been particularly shown and described with reference to embodiments thereof, it will be understood by those of ordinary skill in the art that various changes in form and details may be made therein without departing from the spirit or scope of the invention as defined by the following claims.

What is claimed is:

1. A method of manufacturing a display device, the method comprising:
preparing a cover substrate assembly including a cover substrate, a protective film attached to a lower surface of the cover substrate, and an inspection pattern disposed between the cover substrate and the protective film;
obtaining a first image by imaging the inspection pattern through an upper surface of the cover substrate;
obtaining noise data by comparing a reference image of the inspection pattern with the first image;
obtaining a second image by imaging the cover substrate assembly;
obtaining a corrected image of the second image by reflecting the noise data in the second image; and
detecting a defect of the cover substrate based on the corrected image of the second image.

2. The method of claim 1, wherein the noise data comprises:
a value corresponding to a noise area difference which is a difference between a reference area of the inspection pattern in the reference image and an inspection area of the inspection pattern in the first image.

3. The method of claim 2, wherein the obtaining the corrected image of the second image comprises:
obtaining an imaging defect area of the defect in the second image; and
obtaining the corrected image of the second image by reflecting the noise area difference in the imaging defect area.

4. The method of claim 3, wherein the obtaining the corrected image of the second image by reflecting the noise area difference in the imaging defect area comprises:
comparing the imaging defect area and the inspection area; and
correcting the imaging defect area by reflecting the noise area difference when the imaging defect area is the same as the inspection area.

5. The method of claim 4, wherein the obtaining the corrected image of the second image by reflecting the noise area difference in the imaging defect area further comprises:
obtaining an area correction value proportional to an area difference between the imaging defect area and the inspection area when the imaging defect area is different from the inspection area;
obtaining a corrected area difference by reflecting the area correction value to the noise area difference; and
correcting the imaging defect area by reflecting the corrected area difference.

6. The method of claim 3, wherein the detecting the defect of the cover substrate based on the corrected image of the second image comprises:
obtaining a defect area of the defect;
comparing the defect area with a reference defect area; and
classifying the cover substrate as a defective cover substrate when the defect area is larger than the reference defect area.

7. The method of claim 2, wherein the inspection pattern comprises:
first to $n^{th}$ size inspection patterns, each having different areas from each other, wherein n is a natural number equal to or greater than 2.

8. The method of claim 1, wherein the noise data comprises:
a value corresponding to a noise grayscale difference which is a difference between a reference grayscale of the inspection pattern in the reference image and an imaging grayscale of the inspection pattern in the first image.

9. The method of claim 8, wherein the obtaining the corrected image of the second image by reflecting the noise data in the second image comprises:
obtaining an imaging grayscale distribution of the cover substrate assembly from the second image; and
obtaining the corrected image of the second image having a corrected grayscale distribution by reflecting the noise grayscale difference in the imaging grayscale distribution.

10. The method of claim 9, wherein the detecting the defect of the cover substrate based on the corrected image of the second image comprises:
comparing the corrected grayscale distribution with a normal grayscale range; and
classifying the cover substrate as a defective cover substrate when a grayscale defect having a grayscale outside the normal grayscale range is detected in the corrected grayscale distribution.

11. The method of claim 8, wherein the inspection pattern comprises:
first to $m^{th}$ grayscale inspection patterns, each having different grayscales from each other, wherein m is a natural number equal to or greater than 2.

12. The method of claim 1, further comprising:
removing the protective film and the inspection pattern from the cover substrate assembly when the defect is not detected after the detecting the defect of the cover substrate based on the corrected image of the second image; and
bonding a display panel including pixels under the cover substrate.

13. The method of claim 1, wherein the cover substrate comprises:
a cover window; and
a touch sensing layer disposed under the cover window.

14. A method of manufacturing a display device, the method comprising:
forming a cover substrate assembly by bonding a protective film to a lower surface of a cover substrate;
forming an inspection film by removing a portion of the protective film;
placing the inspection film over an inspection pattern provided on an upper surface of display panel;
obtaining a first image by imaging the inspection pattern through a lower surface of the display panel;
obtaining noise data by comparing a reference image of the inspection pattern with the first image;
obtaining a second image by imaging the cover substrate assembly;
obtaining a corrected image of the second image by reflecting the noise data in the second image; and
detecting a defect of the cover substrate based on the corrected image.

15. The method of claim 14,
wherein the display panel comprises a display area and a peripheral area surrounding the display area, and
wherein the inspection pattern is disposed on the peripheral area.

16. The method of claim 15,
wherein the cover substrate comprises a first area corresponding to the display area and a second area corresponding to the peripheral area, and
wherein the inspection film is formed by removing a portion of the protective film overlapping the second area.

17. The method of claim 14, wherein the noise data comprises:
a value corresponding to a noise area difference which is a difference between a reference area of the inspection pattern in the reference image and an inspection area of the inspection pattern in the first image.

18. The method of claim 14, wherein the noise data comprises:
a value corresponding to a noise grayscale difference which is a difference between a reference grayscale of the inspection pattern in the reference image and an imaging grayscale of the inspection pattern in the first image.

19. The method of claim 14, further comprising:
removing the protective film from the cover substrate assembly when the defect is not detected after the detecting the defect of the cover substrate based on the corrected image of the second image; and
bonding a display panel under the cover substrate.

20. The method of claim 14, wherein the cover substrate comprises:
a cover window; and
a touch sensing layer disposed under the cover window.

* * * * *